US012609776B2

(12) United States Patent
Wang et al.

(10) Patent No.: US 12,609,776 B2
(45) Date of Patent: Apr. 21, 2026

(54) ANTENNA ATTITUDE FAST MEASUREMENT SYSTEM AND METHOD THEREOF

(71) Applicant: XI'AN INSTITUTE OF OPTICS AND PRECISION MECHANICS OF CAS, Xi'an (CN)

(72) Inventors: Hu Wang, Xi'an (CN); Shangmin Lin, Xi'an (CN); Yaoke Xue, Xi'an (CN); Zhen Wang, Xi'an (CN); Meiying Liu, Xi'an (CN); Canglong Zhou, Xi'an (CN); Qinfang Chen, Xi'an (CN); Jie Liu, Xi'an (CN); Yang Liu, Xi'an (CN); Yongjie Xie, Xi'an (CN); Hongman He, Xi'an (CN); Yue Pan, Xi'an (CN); Yang Shen, Xi'an (CN)

(73) Assignee: XI'AN INSTITUTE OF OPTICS AND PRECISION MECHANICS OF CAS, Xi'an (CN)

( * ) Notice: Subject to any disclaimer, the term of this patent is extended or adjusted under 35 U.S.C. 154(b) by 0 days.

(21) Appl. No.: 18/883,324

(22) Filed: Sep. 12, 2024

(65) Prior Publication Data

US 2025/0096911 A1 Mar. 20, 2025

(30) Foreign Application Priority Data

Sep. 18, 2023 (CN) .......................... 202311199170.2

(51) Int. Cl.
*H04B 17/12* (2015.01)
*H04B 1/16* (2006.01)
*H04B 17/19* (2015.01)

(52) U.S. Cl.
CPC ........... *H04B 17/12* (2015.01); *H04B 1/1646* (2013.01); *H04B 17/19* (2015.01)

(58) Field of Classification Search
CPC ............ H04B 17/10–12; H04B 1/1646; H04B 17/15–19; G01R 19/08–10
See application file for complete search history.

(56) References Cited

U.S. PATENT DOCUMENTS

2003/0122078 A1 7/2003 Fritzel
2014/0002297 A1 1/2014 Collins
(Continued)

FOREIGN PATENT DOCUMENTS

CN 106839984 A 6/2017
CN 108168504 A 6/2018
(Continued)

*Primary Examiner* — Hasan Islam
(74) *Attorney, Agent, or Firm* — JEEN IP LAW, LLC

(57) ABSTRACT

An antenna attitude fast measurement system and a method are provided. The measurement system includes a data processing unit, a stereo calibration unit, at least two detector measurement units, and a plurality of target marker units; the target marker unit is arranged on the back of the antenna main reflector of the antenna system to be measured; the detector measurement unit is arranged outside the circumference of the antenna system to be measured; and the stereo calibration unit is arranged directly below the center of the antenna main reflector of the antenna system to be measured. Any two adjacent detector measurement units have a field-of-view intersection area, and there is at least one target marker unit within the field-of-view intersection area. The total number of target marker units in all field-of-view intersection areas is ≥3. The data processing unit is electrically connected to the detector measurement unit.

10 Claims, 3 Drawing Sheets

(56) References Cited

U.S. PATENT DOCUMENTS

2022/0190885 A1* 6/2022 Nakayama ........... H04B 7/0413
2024/0235699 A1* 7/2024 Orozco ................ H04B 17/102
2024/0429600 A1* 12/2024 Li ........................ H04B 7/1851

FOREIGN PATENT DOCUMENTS

CN          110455181 A     11/2019
CN          111025032 A      4/2020
CN          112201923 A      1/2021

* cited by examiner

ANTENNA ATTITUDE FAST MEASUREMENT SYSTEM AND METHOD THEREOF

CROSS-REFERENCE TO RELATED APPLICATIONS

This application claims to the benefit of priority from Chinese Application No. 202311199170.2 with a filing date of Sep. 18, 2023. The content of the aforementioned applications, including any intervening amendments thereto, are incorporated herein by reference.

TECHNICAL FIELD

The present disclosure relates to the technical field of an antenna attitude measurement system and a measurement method using the measurement system, which can be applied to the research field of attitude fast measurement of various antenna systems.

BACKGROUND

With the continuous improvement of the aperture and the observation frequency of the telescope, in order to ensure sensitivity and resolution, antennas are required to have high form accuracy and pointing accuracy during operation. Wherein pointing accuracy is a very important parameter that determines whether the telescope can accurately aim at the observation target and make effective observations.

The antenna pointing accuracy is mainly measured through radio scanning, which determines the strongest signal position by scanning the calibration source, and then compares it with the theoretical target position to obtain the pointing deviation. This method can fully determine the deviation between the antenna beam pointing position and the mechanical axis pointing position with a determined azimuth and elevation angular encoder (also known as rotary encoder), but it requires the observation time of the telescope and is a pointing calibration method. Nowadays, antennas with apertures of tens or even hundreds of meters are operating or being constructed worldwide. These antennas require extremely high pointing accuracy. During the observation process, even small structural errors may cause the pointing accuracy to fail to meet the requirements, thereby failing to achieve the expected goals. This will greatly limit the effective time of large antennas operating at high frequencies. Therefore, it is necessary to develop a pointing measurement system that is fast and does not affect the normal observation of the telescope, so as to provide a feasible scheme for the pointing closed-loop control of the large aperture and high frequency telescope in all working conditions.

SUMMARY

The objective of the present disclosure is to solve the technical problem of occupying telescope observation time in the existing measurement method that determines the strongest signal position by scanning the calibration source through radio scanning, and then comparing it with the theoretical target position to obtain pointing deviation. Therefore, an antenna attitude fast measurement system and a method thereof are provided.

The concept of the present disclosure is as follows:

Each set of detector measurement units determines its own position by measuring the stereo calibration unit. Adjacent detector measurement units measure the target marker unit located in the field-of-view intersection area on the back of the antenna main reflector of the antenna system to be measured, and use the close-range photogrammetry theory to determine the spatial position of the target marker unit. Finally, based on the spatial positions of the target marker units obtained by all detector measurement units, the attitude of the antenna system to be measured is fitted.

In order to achieve the above disclosure objectives and complete the above disclosure concept, the technical solution adopted by the present disclosure is as follows:

An antenna attitude fast measurement system, which is unique in that:

The antenna attitude fast measurement system includes a data processing unit, a stereo calibration unit, at least two detector measurement units, and a plurality of target marker units; the target marker units are arranged on a back of an antenna main reflector of a antenna system to be measured, and moves together with the antenna system to be measured; the detector measurement units are arranged outside a circumference of the antenna system to be measured to monitor the positions of the target marker units real-time; the stereo calibration unit is arranged directly below a center of the antenna main reflector of the antenna system to be measured, and is used to calibrate the detector measurement units;

A field-of-view of each of the detector measurement units covers the stereo calibration unit and some target marker units, as well as a motion range of some target marker units; any two adjacent detector measurement units have field-of-view intersection areas, there is at least one of the target marker units within each of the field-of-view intersection areas, a total number of the target marker units in all field-of-view intersection areas is ≥3;

The data processing unit is electrically connected to the detector measurement units and is used to receive and process the images taken by the detector measurement units to obtain the attitude information of the antenna system to be measured.

Furthermore, the target marker units are spherical structures.

Furthermore, the spherical structures forming the target marker units are supported by support rod structures arranged on a truss of a back of the antenna system to be measured.

Furthermore, the stereo calibration unit includes at least four calibration targets with non-coplanar center points.

Furthermore, the calibration targets are spherical structures.

Furthermore, the detector measurement units include at least one set of measurement detector.

Furthermore, there are at least three target marker units within the field-of-view intersection areas, and the measurement detectors are cameras.

Furthermore, the number of the detector measurement units is twelve or six, and the detector measurement units are uniformly distributed on an outer circumference of the antenna system to be measured.

The present disclosure further provides an antenna attitude fast measurement method, using the above-mentioned antenna attitude fast measurement system, including the following steps:

Step 1, defining any center point in the stereo calibration unit as a base point, and obtaining spatial position information of the rest center points of the stereo calibration unit based on the base point;

Step 2, collecting spatial information from the stereo calibration unit by all detector measurement units, and calculating their relative spatial three-dimensional positions of the detector measurement units with respect to the base point of the stereo calibration unit based on a close-range photogrammetry theory;

Step 3, collecting the information of the target marker units within the field-of-view intersection area by adjacent detector measurement units, and obtaining the spatial three-dimensional coordinates of the target marker units based on the base point of the stereo calibration unit through coordinate transformation according to the close-range photogrammetry theory;

Step 4: fitting the three-dimensional coordinates of all target marker units in the step 2 based on theoretical surface, obtaining an attitude information of the antenna system to be measured based on the stereo calibration unit, and completing a fast measurement of an antenna attitude of the antenna system to be measured.

Furthermore, the step 2 specifically refers to:

Collecting spatial information from the stereo calibration unit by all detector measurement units, and calculating a relative spatial three-dimensional position of the detector measurement units relative to the base point of the stereo calibration unit, according to the close-range photogrammetry theory and the spatial position information of the rest center points in the step 1.

The advantageous effects of the present disclosure are:

1. In the present disclosure, the distribution of the detector measurement units can be determined based on the rotation attitude of the antenna, which is conducive to achieving the optimal allocation of the field-of-view area of the detector measurement units, and also conducive to achieving fast measurement under different attitudes of the antenna system to be measured. In addition, the number of detector measurement units can be determined based on the aperture and rotation amplitude of the antenna system to be measured, and the application objects and the application scenarios of the measurement scheme can be quickly expanded, for example, if the antenna system to be measured is a fixed antenna or has a small rotation amplitude, only a few sets of fixed detector measurement units are needed to complete the measurement. If the rotation amplitude of the antenna system to be measured is 360°, detector measurement units need to be arranged in the circumferential direction of the antenna system to be measured.

2. In the present disclosure, the detector measurement units arranged in the circular array can quickly calibrate its internal orientation parameters and external orientation parameters by calibrating the same stereo calibration unit, and can also unify the spatial measurement coordinate system of the entire antenna attitude measurement system, stabilizing the measurement accuracy.

3. In the present disclosure, the calibration targets in the stereo calibration unit are spatially distributed, which is beneficial for improving the calibration accuracy of the detector measurement unit.

4. In the present disclosure, a spherical structure is selected for the calibration target and the target marker unit to ensure that the calibration target and the target marker unit captured by the detector measurement unit at different positions have consistent spatial coordinates, ensuring the calibration accuracy and measurement accuracy of the detector measurement unit at different positions and different field-of-views.

5. In the present disclosure, the required attitude information of the antenna system to be measured can be fitted with only the spatial positions of a limited number of target marker units. Therefore, when the attitude of the antenna system to be measured changes, as long as some of the detector measurement units can capture a certain amount of the information of the target marker unit in their field-of-view, the attitude of the antenna system to be measured can be fitted, which is conducive to achieving fast and accurate measurement.

6. The antenna system to be measured is often supported by several trusses on a complex back frame. In the present disclosure, the spherical target marker unit can be extended out of the truss through the support rod structure for easy capture by the detector measurement unit without affecting the recognition accuracy.

REFERENCE NUMBERS IN THE DRAWINGS

1—stereo calibration unit; 11—calibration target; 2—detector measurement unit; 3—target marker unit; 4—antenna system to be measured; 5—antenna main reflector; 6—field-of-view intersection area.

DETAILED DESCRIPTION OF THE EMBODIMENTS

Figure 1:
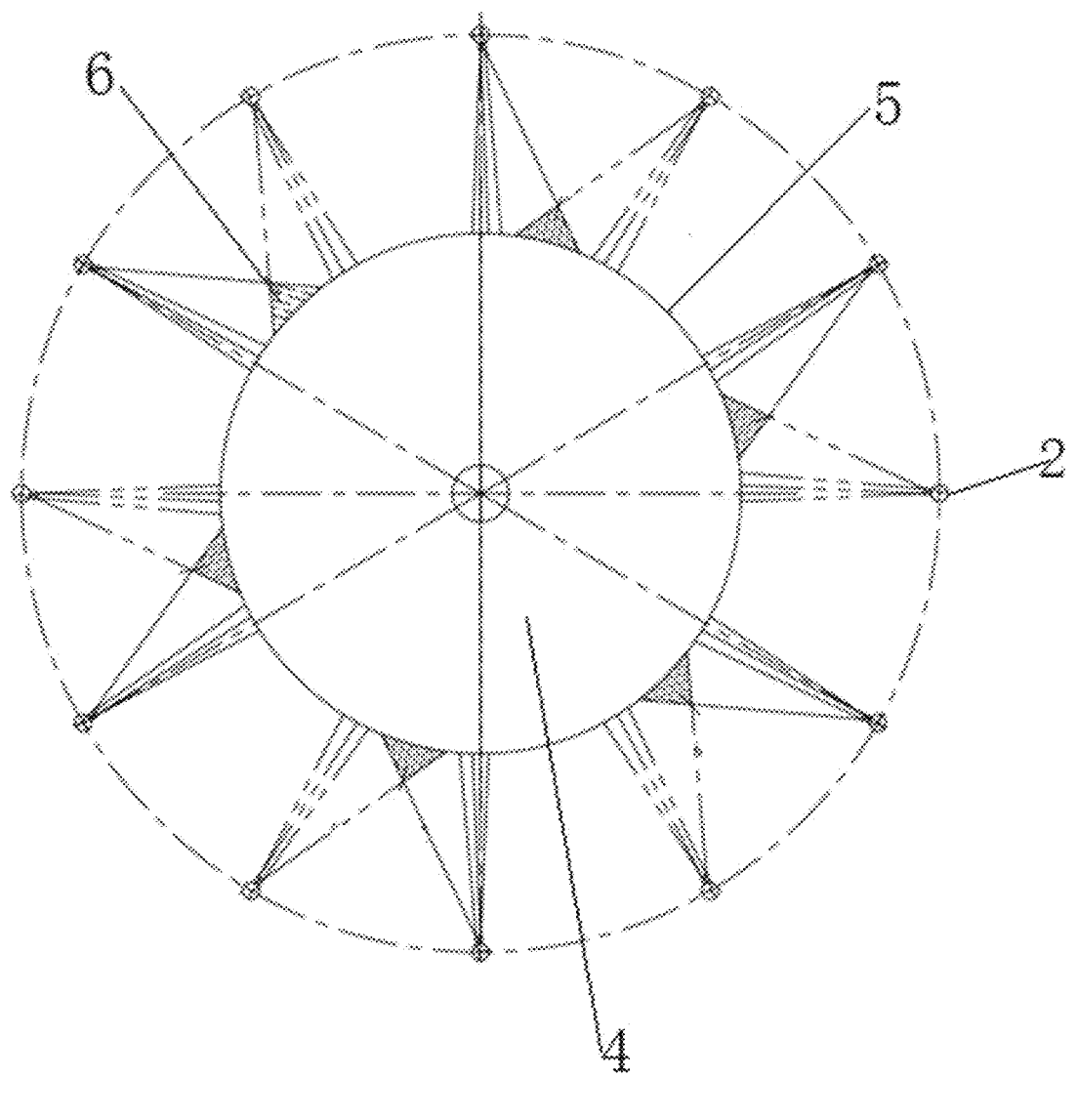
FIG. 1 is a schematic diagram of the circumferential distribution of the detector measurement unit in the embodiment of the antenna attitude fast measurement system of the present disclosure.
Figure 2:
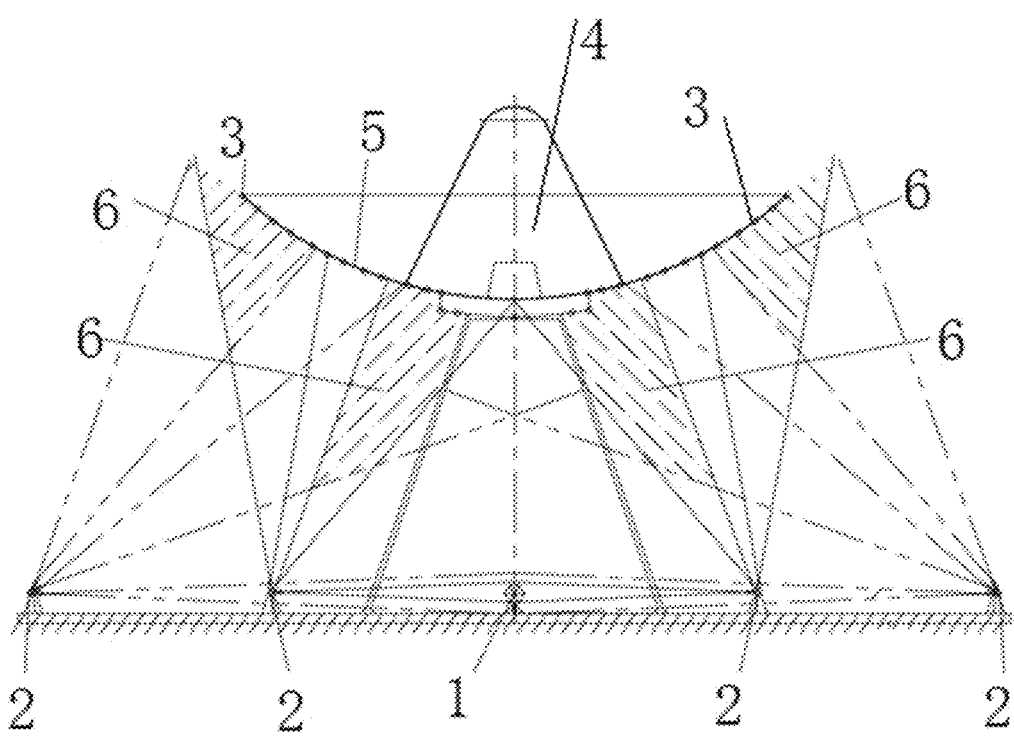
FIG. 2 is the measurement principle diagram of the first attitude of the antenna system to be measured in the embodiment of the antenna attitude fast measurement system of the present disclosure.
Figure 3:
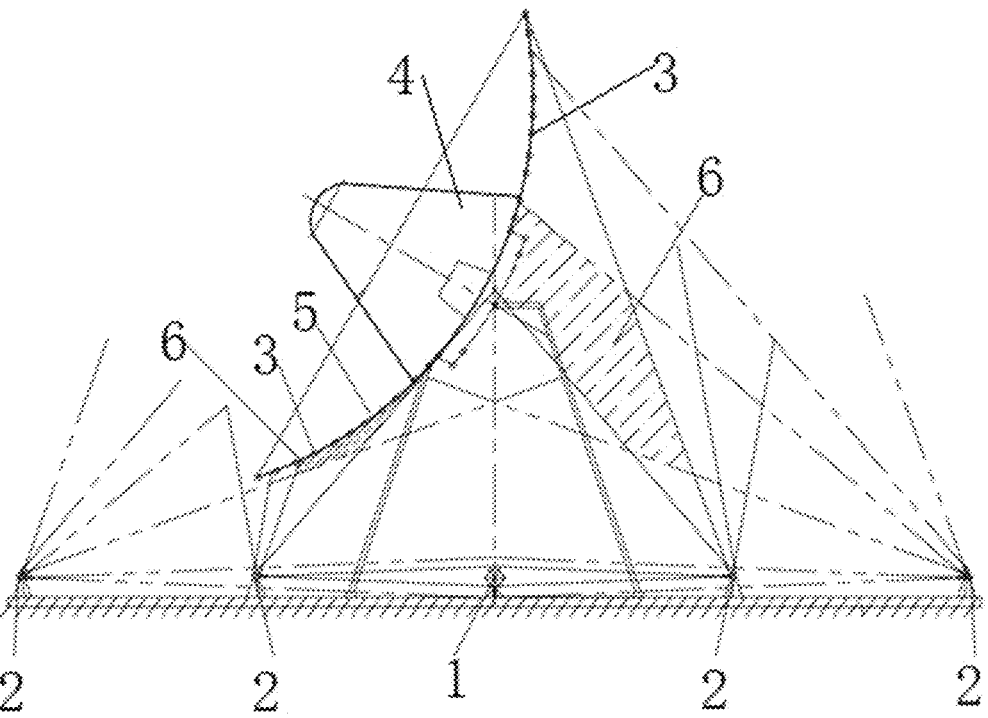
FIG. 3 is the measurement principle diagram of the second attitude of the antenna system to be measured in the embodiment of the antenna attitude fast measurement system of the present disclosure.

The present disclosure provides an antenna attitude fast measurement system, as shown in FIG. 1-FIG. 3, including a data processing unit, a stereo calibration unit 1, a plurality of detector measurement units 2, and a plurality of target marker units 3.

The setting methods for each unit are as follows:

Each of the detector measurement units 2 includes a set of measurement detector, which is a camera.

Figure 4:
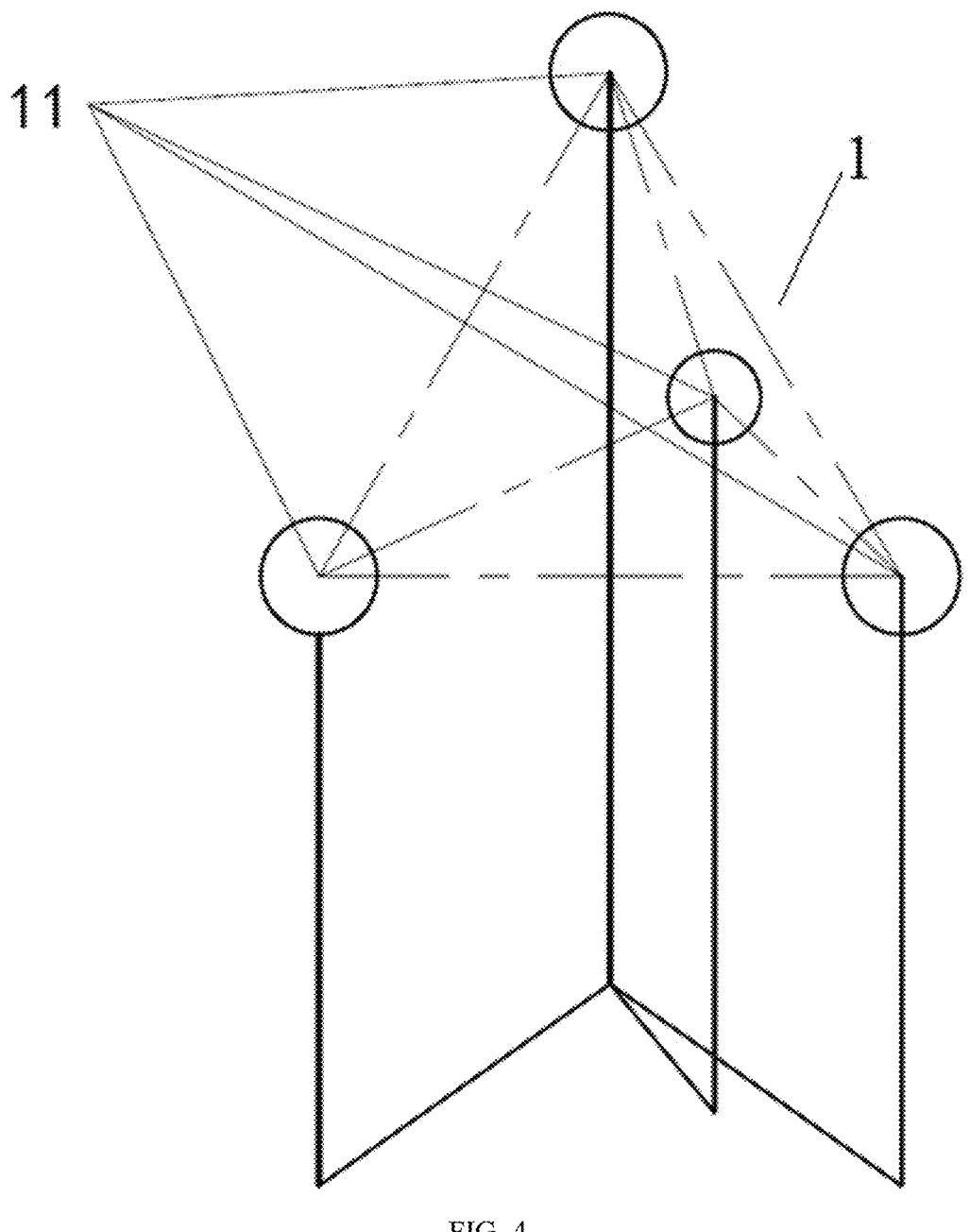
FIG. 4 is a schematic structural diagram of the stereo calibration unit in the embodiment of the antenna attitude fast measurement system of the present disclosure.

As shown in FIG. 4, the stereo calibration unit 1 includes four calibration targets 11 whose center points are not coplanar. These calibration targets 11 have stable and definite relative positions, and have determined feature identifications, such as significant differences in size and dimensions. The calibration target 11 can be a spherical structure.

The target marker unit 3 has a determined feature identification, a plurality of target marker units 3 are supported on the truss at the back of the antenna of the antenna system to be measured 4 through a support rod structure, and are located on the back of the antenna main reflector 5 of the antenna system to be measured 4. The target marker unit 3 can move together with the antenna system to be measured 4, that is, the target marker unit 3 has the same motion attitude as the antenna system to be measured 4, the target marker unit 3 extends out of the truss at the back of the antenna to ensure that the surface features of the target marker unit 3 are captured by the detector measurement unit 2. The target marker unit 3 is a spherical structure.

According to the aperture and rotation amplitude of the antenna system to be measured 4, the number and position of the detector measurement units 2 are set (the field-of-view of the detector measurement unit 2 or the multi-camera array can be selected based on the spatial size of the antenna system to be measured 4; the relative position of the multi-camera array is stable and determined). In the embodiment, the rotation amplitude of the antenna system to be measured 4 is 360°. Therefore, six or twelve detector measurement units 2 are installed on the foundation outside the circumference of the antenna system to be measured 4 and uniformly arranged along the circumference. The stereo calibration unit 1 is arranged on the foundation directly below the center of the back of the antenna main reflector 5 of the antenna system to be measured 4, that is, at the center of the plurality of detector measurement units 2 arranged around the circumference.

The field-of-view of the camera included in each detector measurement unit 2 can simultaneously cover the stereo calibration unit 1, some target marker units 3, and the motion range corresponding to the target marker unit 3. There is a field-of-view intersection area 6 between adjacent detector measurement units 2, and at least one target marker unit 3 is located within the field-of-view intersection area 6 (when the attitude of the antenna system to be measured 4 changes, it can ensure that at least three target marker units 3 are captured by the detector measurement unit 2). In the present embodiment, there are at least six target marker units 3 within all the field-of-view intersection areas (the principle is as follows: a plurality of non-concentric and non-coplanar target marker units 3 are used to fit a theoretical surface. The surface fitted have the same attitude as the antenna system to be measured 4. Therefore, the attitude of the antenna system to be measured 4 can be characterized by the fitted surface). The data processing unit is electrically connected to all detector measurement units 2, controls the detector measurement units 2 to simultaneously capture images, receives the image information captured by the detector measurement units 2, and processes the image information to obtain the spatial position information of the detector measurement units 2 relative to the stereo calibration unit 1, as well as the spatial position information of the target marker units 3 relative to the stereo calibration unit 1, in addition, it fits the spatial position information of the target marker unit 3 based on the theoretical surface to obtain the attitude information of the antenna system to be measured 4 based on the coordinate system of the stereo calibration unit 1.

The working principle of the present disclosure is as follows:

A plurality of detector measurement units 2 are established on the foundation circumference of the large aperture antenna system to be measured. A camera network composed of a plurality of detector measurement units 2 monitors a plurality of spherical target marker units 3 arranged on the back of the antenna main reflector 5 in real time. When the antenna system to be measured 4 starts working, the shape of the antenna main reflector 5 is deformed under the affecting of the antenna attitude changes and environmental influences, the antenna attitude fast measurement system can quickly obtain the spatial three-dimensional coordinates of the spherical target marker units 3 (in the geodetic coordinate system) based on the stereo calibration unit 1, then fit the attitude information of the antenna system to be measured 4 and feed back. finally, the closed-loop control of the attitude of the antenna system to be measured 4 is realized, improving the pointing control accuracy of the telescope.

In other embodiments, the rotation amplitude of the antenna system to be measured 4 may be less than 360°. At this time, a corresponding number of the detector measurement units 2 are arranged at the corresponding positions within the rotation range of the antenna system to be measured 4 to ensure the full use of detector measurement units 2 and save resources.

The present disclosure also provides a fast measurement method of antenna attitude, using the above-mentioned antenna attitude fast measurement system, including the following steps:

Step 1, calibrating the internal orientation parameters of the detector measurement unit 2 in advance, defining any central point in the stereo calibration unit 1 as a base point, establishing a three-dimensional coordinate system, and obtaining the spatial position information of each calibration target 11 in the stereo calibration unit 1, wherein the central point can be the center of any calibration target 11 or the center between any two calibration targets 11, three calibration targets 11 or four calibration targets 11;

Step 2, collecting image information of the stereo calibration unit 1 by all detector measurement units 2, calculating the relative spatial three-dimensional position of the detector measurement unit 2 relative to the base point of the stereo calibration unit 1 (the external orientation parameter of the detector measurement unit 2) according to the captured image information and based on the principle of monocular camera calibration and the spatial position information of each calibration target 11 in the step 1, and establishing the spatial position distribution of the detector measurement unit 2 based on the coordinate system of the stereo calibration unit 1;

Step 3, controlling all detector measurement units 2 to simultaneously capture images, obtaining images of the antenna system to be measured 4 from different orientations under the same attitude; capturing unobstructed target marker units 3 on the antenna system to be measured 4 within the field-of-view intersection area 6 by adjacent detector measurement units 2; using the close-range photogrammetry theory, obtaining the spatial three-dimensional coordinates of these target marker units 3 based on the coordinate system of the stereo calibration unit 1 through coordinate transformation;

Step 4, fitting the three-dimensional coordinates of all available target marker units 3 based on theoretical surface to obtain the attitude information of the antenna system to be measured 4 based on the coordinate system of the stereo calibration unit 1 to complete the fast measurement of the antenna attitude of the antenna system to be measured 4.

What is claimed is:

1. An antenna attitude fast measurement system, comprising a data processing unit, a stereo calibration unit, at least four detector measurement units, and a plurality of target marker units; the target marker units are arranged on a back of an antenna main reflector of an antenna system to be measured, and move together with the antenna system to be measured; the detector measurement units are arranged outside a circumference of the antenna system to be measured, and a camera network composed of the plurality of detector measurement units is used for real-time monitoring of positions of the target marker units; and the stereo calibration unit is arranged directly below a center of the antenna main reflector and is used to calibrate the detector measurement units;

wherein a distribution of the detector measurement units is determined based on a rotation attitude of the antenna system to be measured, and a number of the detector measurement units is determined based on an aperture and the rotation amplitude of the antenna system to be measured;

wherein a field-of-view of each of the detector measurement units covers the stereo calibration unit and some of the target marker units, as well as a motion range of some of the target marker units; any two adjacent detector measurement units of the at least four detector measurement units have field-of-view intersection areas, such that there is at least one of the target marker units within each of the field-of-view intersection areas, and a total number of the target marker units within all of the field-of-view intersection areas is equal to or greater than 3;

wherein the data processing unit is electrically connected to the detector measurement units and is used to receive and process images taken by the detector measurement units, obtain spatial three-dimensional coordinates of the target marker units based on a base point of the stereo calibration unit, and fit the three-dimensional coordinates based on a theoretical surface to obtain attitude information of the antenna system to be measured.

2. The antenna attitude fast measurement system according to claim 1, wherein the target marker units are spherical structures.

3. The antenna attitude fast measurement system according to claim 2, wherein the spherical structures forming the target marker units are supported by a support rod structure arranged on a truss of a back of the antenna system to be measured.

4. The antenna attitude fast measurement system according to claim 2, wherein the stereo calibration unit comprises at least four calibration targets with non-coplanar center points.

5. The antenna attitude fast measurement system according to claim 4, wherein the calibration targets are spherical structures.

6. The antenna attitude fast measurement system according to claim 1, wherein each of the detector measurement units comprises at least one set of measurement detector.

7. The antenna attitude fast measurement system according to claim 6, wherein there are at least three target marker units within the field-of-view intersection areas, and the measurement detector is a camera.

8. The antenna attitude fast measurement system according to claim 7, wherein the number of the detector measurement units is twelve or six, and the detector measurement units are uniformly distributed on an outer circumference of the antenna system to be measured.

9. An antenna attitude fast measurement method, using the antenna attitude fast measurement system as claimed in claim 1, wherein the method comprises following steps:

step 1, defining any center point in the stereo calibration unit as a base point, and obtaining a spatial position information of the rest center points of the stereo calibration unit based on the base point;

step 2, collecting spatial information from the stereo calibration unit by all of the detector measurement units, and calculating relative spatial three-dimensional positions of the detector measurement units relative to the base point of the stereo calibration unit based on a close-range photogrammetry theory;

step 3, collecting the information from the target marker units within the field-of-view intersection area by adjacent detector measurement units of the at least four detector measurement units, and obtaining the spatial three-dimensional coordinates of the target marker units based on the base point of the stereo calibration unit through the close-range photogrammetry theory and coordinate transformation;

step 4, fitting the three-dimensional coordinates of all target marker units in the step 2 based on theoretical surface, obtaining an attitude information of the antenna system to be measured based on the stereo calibration unit to complete a fast measurement of an antenna attitude of the antenna system to be measured.

10. The antenna attitude fast measurement method according to claim 9, wherein the step 2 comprises: collecting the spatial information from the stereo calibration unit by all of the detector measurement units, and calculating the relative spatial three-dimensional positions of the detector measurement units relative to the base point of the stereo calibration unit based on a close-range photogrammetry theory and the spatial position information of the rest center points in the step 1.

\* \* \* \* \*